United States Patent [19]
Saito

[11] 3,946,440
[45] Mar. 23, 1976

[54] DUAL ERASING CORE STRUCTURE FOR SELECTIVELY ERASING ADJACENT RECORDING

[75] Inventor: Takeshi Saito, Chichibu, Japan

[73] Assignees: Canon Kabushiki Kaisha; Canon Denshi Kabushiki Kaisha, both of Tokyo, Japan

[22] Filed: Dec. 3, 1974

[21] Appl. No.: 529,118

Related U.S. Application Data

[63] Continuation of Ser. No. 388,956, Aug. 16, 1973, abandoned.

[30] Foreign Application Priority Data

Aug. 22, 1972 Japan............................ 47-98012[U]

[52] U.S. Cl. ............................................... 360/118
[51] Int. Cl.² ....................... G11B 5/12; G11B 5/22
[58] Field of Search....................... 360/118, 121, 66

[56] References Cited
FOREIGN PATENTS OR APPLICATIONS 1,167,053   4/1964   Germany ............................ 360/118

*Primary Examiner*—Robert S. Tupper
*Attorney, Agent, or Firm*—Fitzpatrick, Cella, Harper & Scinto

[57] ABSTRACT

A magnetic eraser device comprises a first and a second erase head having respective magnetic gaps therein. The two heads are aligned transversely of a recording track on a magnetic recording medium. The magnetic gaps of the two head are perpendicular to the axis of the recording track and offset from each other. The surfaces of the two erase heads which are opposed to each other are spaced apart a predetermined distance and inclined at a predetermined angle with respect to the axis of the recording track. Alternatively, such surfaces of the two erase heads are spaced apart a predetermined distance but may be parallel to the axis of the recording track and stepped symmetrically between the magnetic gaps.

8 Claims, 9 Drawing Figures

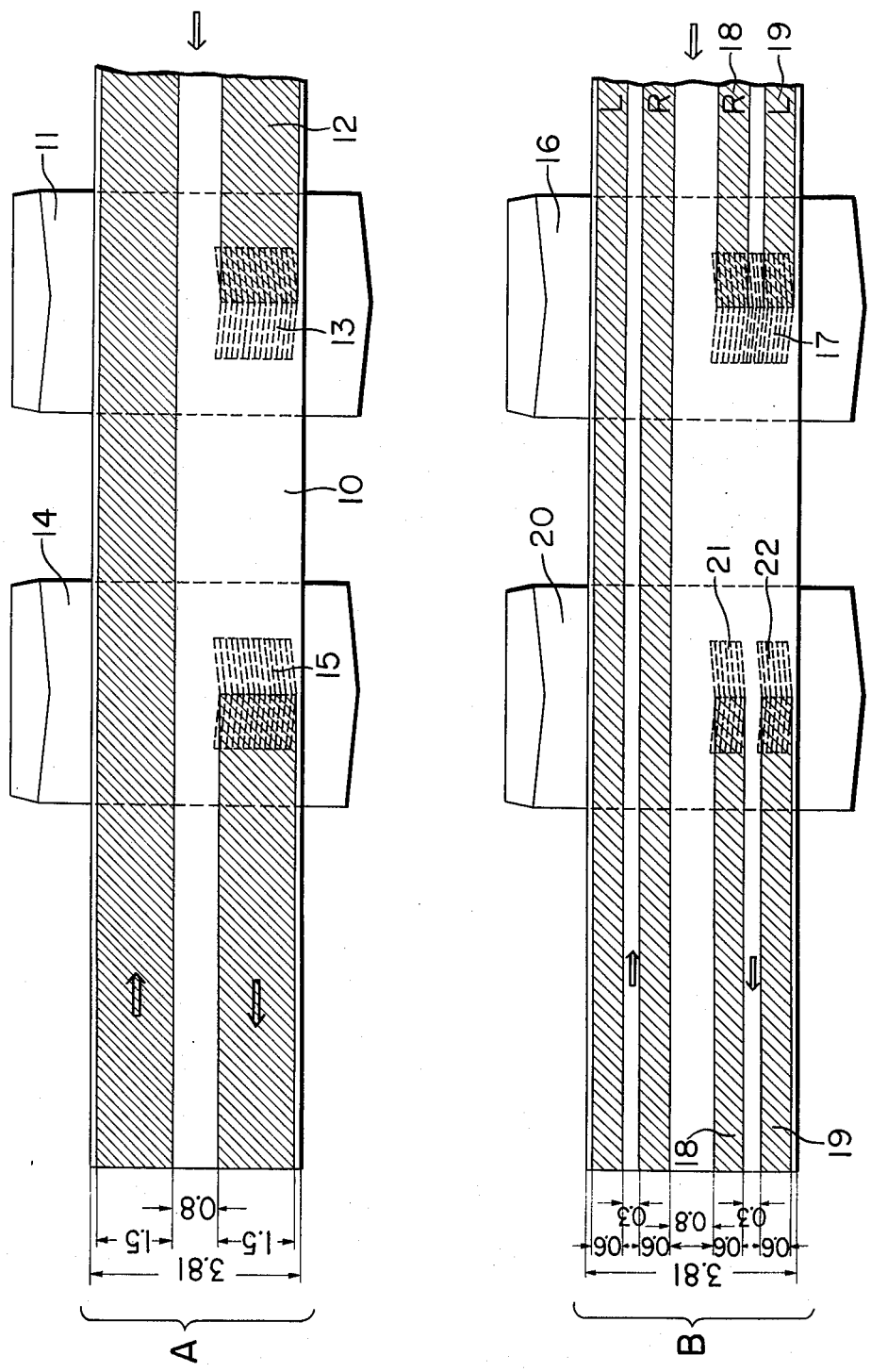

DUAL ERASING CORE STRUCTURE FOR SELECTIVELY ERASING ADJACENT RECORDING

This is a continuation, of application Ser. No. 388,956, filed Aug. 16, 1973, and now abandoned.

BACKGROUND OF THE INVENTION

1. Field of the Invention

This invention relates to a magnetic eraser device for erasing records on magnetic recording media, and more particularly to a magnetic eraser device having a plurality of erase heads arranged in juxtaposition.

2. Description of the Prior Art

Cassette tapes have a narrower tape width than that of those tapes commonly used with open reels, and accordingly a narrower track width than that of the latter tapes.

A cassette tape, as shown in FIG. 1 of the accompanying drawings, has a tape width of 3.81 mm, and in case of the monaural system, two recording tracks each having a width of 1.5 mm are provided in parallel spaced relationship on such tape with a blank section of 0.8 mm width interposed therebetween, in the manner as shown in FIG. 1A. In case of the stereophonic system, two left and right tracks for recording stereophonic signals are formed in each monaural track to assure the compatibility with the monaural system. For example, as shown in FIG. 1B, two recording tracks each having a width of 0.6 mm are provided in each monaural track with a blank section of 0.3 mm width interposed therebetween.

A magnetic eraser device as indicated by 11 in FIG. 1A has heretofore been used with such cassette tape having monaural tracks formed therein. The magnetic eraser device 11 comprises an erase head 13 having a gap length substantially equal to the width of a recording track 12 on the cassette tape 10, the erase head 13 being disposed so as to correspond to the track 12. An erase current applied to such erase head 13 may erase the record on the track 12, whereafter any desired new information may be recorded on the erased track by means of a recording head 15 forming a magnetic recording device 14.

Turning to FIG. 1B, a magnetic eraser device 16 usable with a tape having stereophonic tracks may likewise comprise a magnetic erase head 17 having an erase gap length similar to that in the aforesaid monaural system the erase head 17 being used to erase the recording tracks in the right and left channels 18 and 19 at a time. Thereafter, two types of new information may be recorded on those erased tracks by means of two record heads 21 and 22 forming a magnetic recording device 20.

Where the tape is thus used as an ordinary stereophonic tape, the use of a single erase head for erasing two tracks simultaneously as shown in FIG. 1B would encounter no problem. However, when it is desired to record distinct signals entirely discretely on the respective tracks 18 and 19 which form stereophonic tracks, the stereophonic tracks 18 or 19 must be erased individually.

For example, where the stereophonic cassette tape as shown in FIG. 1B is used for the foreign language training, the instructor's model pronounciation is prerecorded on one of the tracks such as 18 and the trainee may play back this track to reproduce and listen to the instructor's pronounciation as he erases the other track 19 while speaking after the instructor's model pronounciation to thereby have the signals representative of his own pronounciation recorded on the erased track, whereafter the trainee may play back both tracks to listen to the signals reproduced from the two tracks, thus aurally comparing his own pronounciation with the instructor's model to check up any defects or differences in his own pronounciation.

Thus, in such language training applications, the content of the track 18 must not be erased while the track 19 alone must be erased. For such purposes, the magnetic eraser devices as shown in FIG. 2 have been widely used. One of them, as shown in FIG. 2A, comprises erase heads 23 and 24 corresponding to the two tracks 18 and 19 and each having a gap length substantially equal to the width of each track, the erase heads 23 and 24 being shown with their respective gaps 25 and 26 being substantially aligned with each other. Such aligned head gaps, however, might result in a possibility that even when one of the erase heads such as 24 is being operative to erase only one of the tracks such as 19, some leakage flux which may usually present around the head gap 26 reaches the erase head 23 to provide an erase flux between the magnetic heads 23 and 24 and between the head gaps 25 and 26 which would adversely affect the signals recorded on the track 18.

To eliminate such a drawback, there will occur to mind an arrangement as shown in FIG. 2B wherein erase heads 27 and 28 corresponding to the two tracks 18 and 19 have their head gaps 29 and 30 located in offset relationship with each other. Nevertheless, both of the magnetic eraser devices as shown in FIGS. 2A and B would encounter difficulties if they are used with a monaural tape. Even if the two heads such as 23 and 24 or 27 and 28 are simultaneously energized to erase one track such as 12 in the monaural tape, the flux density between the two erase heads will necessarily become decreased to leave the recorded signals unerased. If the two adjacent erase heads are brought into closer proximity in order to eliminate such unerased signals which result during the monaural mode, there would occur another inconvenience that when only one of the tracks is to be erased in order to have signals recorded discretely on the stereophonic tracks, part of the other track is also erased out. It will thus be apparent that the extent of proximity permissible between the two heads is necessarily limited and that even the maximum proximity within such limit will not be successful in erasing the monaural track.

A magnetic eraser arrangement for proving such compatibility with the monaural system is shown in FIG. 2C, wherein there is provided an erase head 31 corresponding to one of the stereophonic tracks such as 19 and an erase head 32 adjacent to the head 31 and corresponding to the monaural track. In the magnetic eraser device as shown in FIG. 2C, the magnetic head 31 is energized to erase one of the stereophonic tracks (e.g., track 19) and the magnetic head 32 is used to erase the two tracks or the monaural track. Such arrangement of the erase heads ensures the compatibility between the monaural and the stereophonic system, but unfortunately increases the size of the magnetic eraser device. Moreover, this arrangement cannot erase the track 18 independently of the other track and if an additional erase head were provided to erase the track 18 alone, the magnetic eraser device would become much larger in size.

SUMMARY OF THE INVENTION

It is therefore an object of the present invention to provide a magnetic eraser device which is capable of erasing a single recording track spanning a plurality of erase heads.

It is another object of the present invention to provide a magnetic eraser device which is capable of selectively erasing adjacent magnetic tracks and erasing a single track spanning such plural magnetic tracks and which is compact and has a reduced number of erase heads.

It is still another object of the present invention to provide a magnetic eraser device which is suitable for use in language laboratory system employing cassette tapes.

It is yet another object of the present invention to provide a magnetic eraser device in which a plurality of erase heads are disposed one above the other.

These and other objects and features of the present invention will become more fully apparent from the following detailed discription taken in conjunction with the accompanying drawings.

BRIEF DESCRIPTION OF THE DRAWINGS

FIG. 1 illustrates the relation between the recording tracks in a cassette tape and the magnetic eraser device, FIG. 1A showing the manner in which monaural signals are recorded and FIG. 1B showing the manner in which stereophonic signals are recorded.

DESCRIPTION OF THE PREFERRED EMBODIMENTS

Figure 2A:
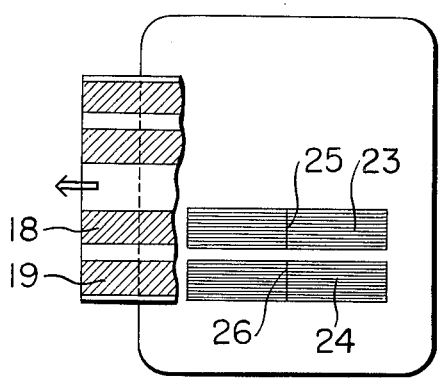
FIGS. 2A through 2C illustrate various known arrangements of erase heads for selectively erasing stereophonic magnetic tracks on a magnetic tape having stereophonic signals recorded thereon, FIG. 2A showing an arrangement with two erase heads having their head gaps sligned with each other, FIG. 2B showing an arrangement with two erase heads having their head gaps offset from each other, and FIG. 2C showing an arrangement having an erase head for erasing one of the stereophonic magnetic tracks and an erase head for erasing the stereophonic magnetic tracks including said one track.
Figure 2B:
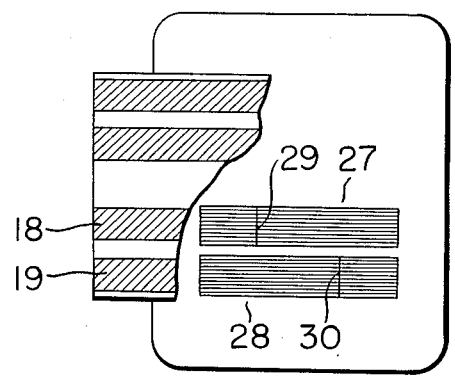
Figure 2C:
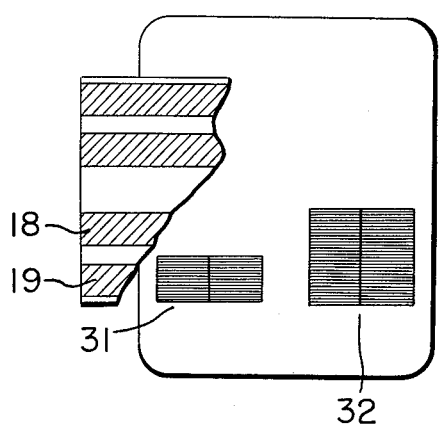

Reference was already had to FIGS. 1 and 2.

Figure 3A:
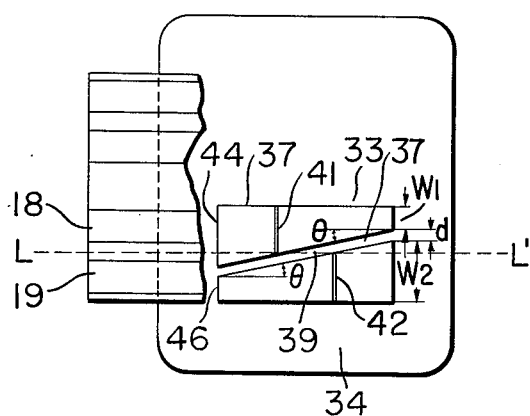
FIGS. 3A and B are a front view and a perspective view, respectively, of the magnetic eraser device according to an embodiment of the present invention.

Now, referrring to FIG. 3, there are seen erase head 33 and 34 which respectively correspond to tracks 18 and 19 in a tape. The erase heads have cores 35 and 36, respectively, and are designed such that the surfaces of the cores which face each other are inclined with respect to the axis of the tracks 18 and 19. More specifically, the top surface 37 of that portion of the core 35 which contacts the tape and the bottom surface 38 of that portion of the core 36 which contacts the tape are substantially parallel to the axis of the tracks 18 and 19 in the tape, but the bottom surface 39 of said portion of the core 35 and the top surface 40 of said portion of the core 36 are inclined at a predetermined angle $\theta$ with respect to the axis of the tracks 18 and 19 in the tape.

Figure 3B:
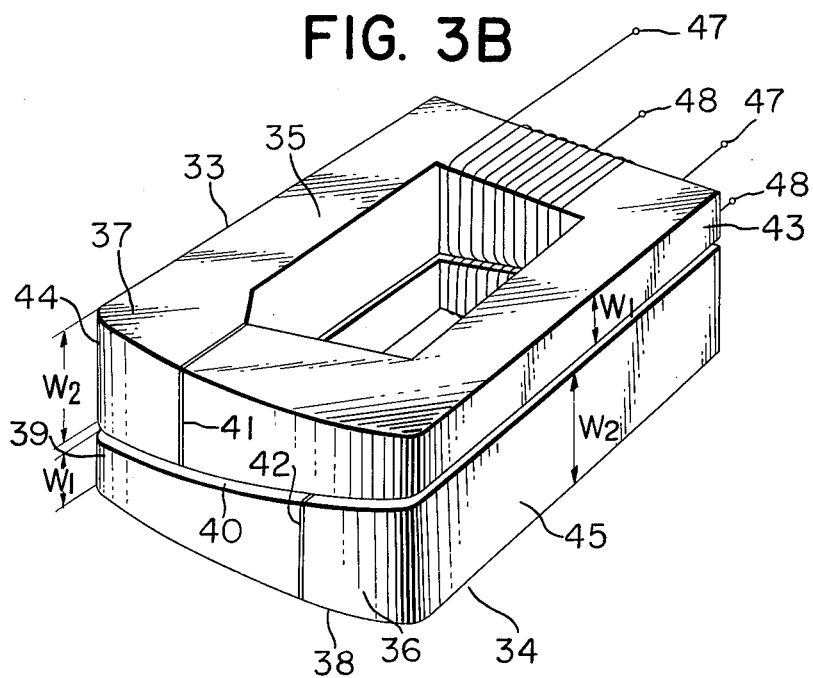

The two erase heads 33 and 34 are disposed with a distance $d$ therebetween but with their head gaps 41 and 42 offset from each other so that the straight line L–L' passing the head gap 41 at the bottom surface 39 of the erase head 33 and the head gap 42 at the top surface 40 of the erase head 34 is substantially parallel to the axis of the tracks in the tape. However, it should be understood that this is not an imperative but a desirable condition. A magnetic head device presenting the described configuration in the surface thereof with respect to which the tape frictionally slides may be provided, as shown in FIG. 3B, by giving heights W1 and W2 to the end surfaces 43 and 44 which are substantially perpendicular to the top surface 37 of the core 35 and by locating the bottom surface 39 of the core 35 in a plane passing said end surfaces 43 and 44, as well as by giving heights W1 and W2 to the end surfaces 45 and 46 which are substantially perpendicular to the bottom surface 38 of the core 36 and by locating the top surface 40 of the core 36 in a plane passing said end surfaces 45 and 46, and further by spacing the erase heads 33 and 34 a distance $d$ apart from each other. It will be seen that coils 47 and 48 are provided on the respective erase heads 33 and 34 to energize these heads individually.

In the above-discribed magnetic eraser device, if it is desired to selectively erase one of the stereophonic tracks 18 and 19, it may be accomplished by energizing the erase head corresponding to the desired track. For example, if the track 18 is to be erased, the erase head 33 may be energized; if the track 19 is to be erased, the erase head 34 may be energized.

Also, if it is desired to erase a monaural track comprising the tracks 18 and 19 and a track provided by the blank section therebetween, then the two erase heads 33 and 34 may be energized simultaneously. Thus, the head gap 42 of the head 34 will erase the lower portion of the monaural track below the line L–L' while the head gap 41 of the head 33 will erase the upper portion of the monaural track above the line L–L', whereby the monaural track may be completely erased over the entire width thereof.

Actually, there is a leakage of flux from the head gaps 41 and 42 which is sufficient to aid in completely erasing the monaural track even if the lower extremity of the head gap 41 and the upper extremity of the head gap 42 are short of the line L–L'.

Figure 4A:
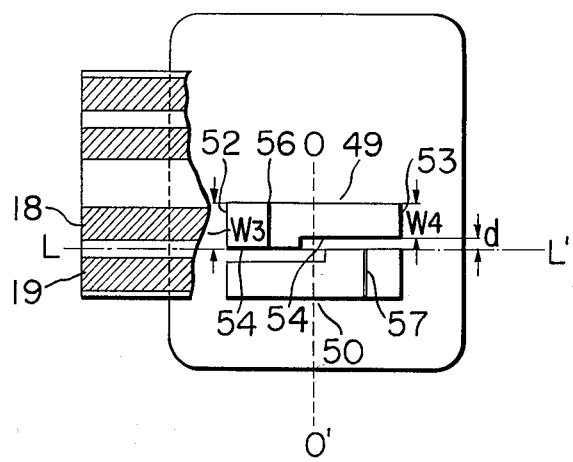
FIGS. 4A and B are a front view and a perspective view, respectively, of the magnetic eraser device according to another embodiment of the present invention.
Figure 4B:
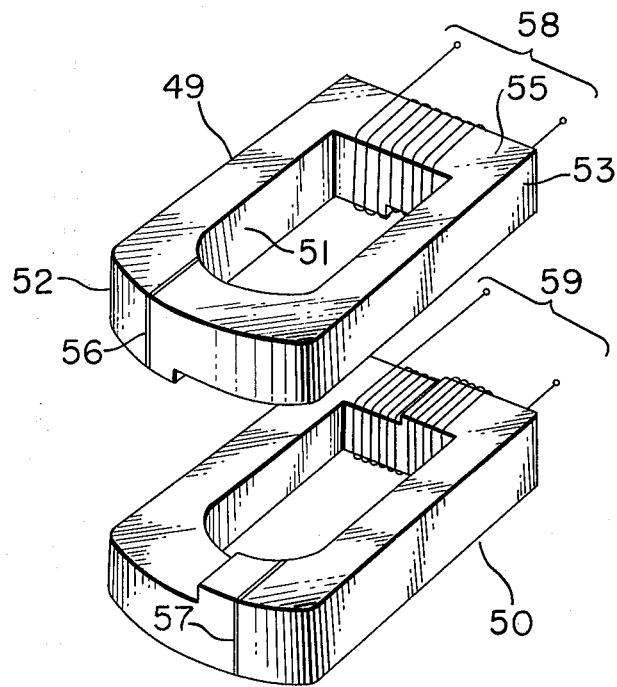

FIG. 4 shows a further embodiment of the present invention in which erase heads 49 and 50 are disposed to correspond to the stereophonic tracks 18 and 19. The erase head 49 comprises a core 51 having opposite end surfaces 52 and 53, a bottom surface 54 and a top surface 55. The end surfaces 52 and 53 have heights of W3 and W4, respectively. The bottom surface 54 includes a surface portion which extends from the end surface 53 to a point substantially adjacent to the center line O–O' and which is parallel to the top surface 55 with a uniform distance W4 therefrom, and a surface potion which extends from the end surface 52 to a point substantially adjacent to the center line O–O' and which is parallel to the top surface 55 with a uniform distance W3 therefrom. Thus, the bottom surface 54 is stepped near the center line O–O', and a gap 56 is provided in the bottom surface portion of height W3. The top surface of the erase head 50 is stepped symmetrically with the bottom surface of the head 49 and has a gap 57 also symmetrical with the gap 56. Such two heads are spaced apart a distance $d$ so that the lower extremity of the gap 56 and the upper extremity of the gap 57 lie substantially on the horizontal center line L–L' extending axially and centrally of the blank section interposed between the stereophonic tracks 18 and 19.

With such arrangement, when it is desired to erase the stereophonic track 18 alone, it may be accomplished by applying an erase current to a coil 58 would on the erase head 49; when it is desired to erase the track 19 alone, it may be accomplished by applying an erase current to a coil 59 wound on the erase head 50.

To erase the monaural track comprising the tracks 18 and 19 and the blank section interposed therebetween, the erase heads 49 and 50 may be energized simultaneously. Thus, the erase head 49 will erase the upper portion of the monaural track above the line L–L' while the erase head 50 will erase the lower portion of the monaural track below the line L–L', whereby the monaural track will be completely erased over full width thereof.

Figure 5:
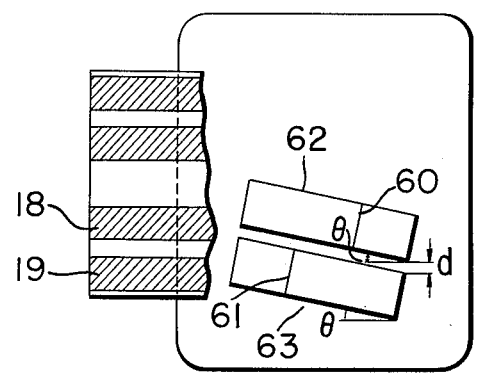
FIG. 5 is a front view showing a further embodiment of the magnetic eraser device according to the present invention.

FIG. 5 shows still a further embodiment of the present invention in which two erase heads 62 and 63 having gaps 60 and 61 disposed therein in offset relationship are inclined at an angle $\theta$ with respect to the axis of the tape track and spaced apart from each other by a distance $d$ so that the lower extremity of the gap 60 in the erase head 62 and the upper extremity of the gap 61 in the erase head 63 lie substantially on the straight line (not shown) extending axially and centrally of the blank section in the track.

Thus, when it is desired to selectively erase one of the stereophonic tracks, it may be accomplished by energizing the erase head corresponding to the desired track; when it is desired to erase the monaural track, it may be accomplished by energizing the two erase heads simultaneously.

In all the above-described embodiment, it has been stated that the line passing the opposed extremities of the gaps in the two erase heads is substantially parallel to the axis of the track and extends centrally of the blank section between the stereophonic tracks, whereas in the actual erase head there is some leakage flux which is sufficient to provide an erasing effect over a greater width than the gap length and therefore, some clearance can exist between the two paths depicted on the magnetic tape by the two erase gaps. Thus, the straight line passing the opposed extremities of the two erase gaps may alternatively be inclined with respect to the axis of the track.

I claim:

1. A combination erasing head for selectively erasing a plurality of tracks of a recording medium having parallel first and second tracks provided with a blank section interposed therebetween, comprising:
   first and second erasing cores for the recording medium, said first erasing core having a first face engaging the recording medium including a portion extending across the first track and one half of the blank section and having an end face formed in a single plane, said second erasing core having a first face engaging the recording medium including a portion extending across the second track and one half of the blank section and having an end face formed in a single plane, said end faces being parallel and opposed adjacent each other;
   said first erasing core having only one erasing gap, said gap being provided in said portion of said first face and spanning the first track and substantially one half of the blank section;
   said second erasing core having only one erasing gap, said gap being provided in said portion of said first face and spanning the second track and substantially one half of the blank section, said second erasing gap being spaced longitudinally from said first erasing gap.

2. An erasing head according to claim 1, wherein the end faces of both of said cores are disposed at an angle with respect to the length of the tracks.

3. An erasing head according to claim 2, wherein said erasing gaps are arranged substantially perpendicular to the length of the tracks.

4. An erasing head according to claim 2, wherein a line passing through an end of said first gap and an end of said second gap is parallel to the tracks of the recording material.

5. An erasing head according to claim 2, wherein said erasing gaps are arranged at an angle with respect to the length of the tracks.

6. An erasing head according to claim 2, wherein said erasing gaps are arranged substantially perpendicular to said end faces of the respective erasing cores.

7. An erasing head according to claim 2, wherein said first erasing core and said second erasing core have the same configuration.

8. A combination erasing head for selectively erasing a plurality of tracks of a recording medium having parallel first and second tracks provided with a blank section interposed therebetween, comprising:
   first and second erasing cores for the recording medium, said first erasing core having a first face engaging the recording medium including a portion extending across the first track and one half of the blank section and having an end face formed in a single plane substantially perpendicular to said first face, said second erasing core having a first face engaging the recording medium including a portion extending across the second track and one half of the blank section and having an end face formed in a single plane substantially perpendicular to its first face and opposing said first erasing core, the end face of said second erasing core being in parallel and adjacent to the end face of said first erasing core;
   said first erasing core having only a first erasing gap provided in said first face, said gap engaging the first track and substantially one half of the blank section;
   said second erasing core having only a second erasing gap provided in said first face, said gap engaging the second track and substantially one half of the blank section, said second erasing gap being spaced longitudinally from said first erasing gap.

* * * * *